United States Patent
Khovanskiy et al.

(10) Patent No.: US 10,260,459 B2
(45) Date of Patent: Apr. 16, 2019

(54) HYDROGEN MOTOR VEHICLE WITHOUT HYDROGEN ON BOARD

(71) Applicants: HyTRIB Corporation GmbH, Freiburg im Breisgau (DE); Viacheslav Nikolaevich Khovanskiy, Moscow (RU)

(72) Inventors: Viacheslav Nikolaevich Khovanskiy, Moscow (RU); Alexandr Leonidovich Burov, Moscow (RU); Vyacheslav Vasilievich Kozlyakov, Odintsovo Moskovskaya Oblast (RU); Azat Khasanovich Khayri, Pushkino Moskovskaya Oblast (RU); Valerij Sergeevich Tereschuk, Moscow (RU)

(73) Assignees: HyTRIB Corporation, GmbH, Breisgau (DE); Viacheslav Nikolaevich Khovanskiy, Moscow (RU)

( * ) Notice: Subject to any disclaimer, the term of this patent is extended or adjusted under 35 U.S.C. 154(b) by 562 days.

(21) Appl. No.: 14/907,154

(22) PCT Filed: Jul. 22, 2013

(86) PCT No.: PCT/RU2013/000627
§ 371 (c)(1),
(2) Date: Jan. 22, 2016

(87) PCT Pub. No.: WO2015/012710
PCT Pub. Date: Jan. 29, 2015

(65) Prior Publication Data
US 2016/0169163 A1 Jun. 16, 2016

(51) Int. Cl.
*F02B 43/08* (2006.01)
*F02M 25/12* (2006.01)
(Continued)

(52) U.S. Cl.
CPC ............. *F02M 25/12* (2013.01); *B01J 7/02* (2013.01); *B60K 15/00* (2013.01); *C01B 3/08* (2013.01);
(Continued)

(58) Field of Classification Search
CPC .... F02M 25/12; F01P 3/22; F01P 3/20; F01N 3/046; F01N 2260/024; F02B 43/10;
(Continued)

(56) References Cited

U.S. PATENT DOCUMENTS 3,608,660 A * 9/1971 Smith ................ F02B 47/00
123/1 A
6,332,434 B1 * 12/2001 De Souza ............. C25B 9/06
123/3
(Continued)

FOREIGN PATENT DOCUMENTS

JP H5-302549 11/1993
JP 2001159372 A 6/2001
(Continued)

OTHER PUBLICATIONS

Supplementary European Search Report for EP Patent Application No. EP13890244 dated Jan. 18, 2017.
(Continued)

*Primary Examiner* — Hung Q Nguyen
(74) *Attorney, Agent, or Firm* — Meyertons, Hood, Kivlin, Kowert & Goetzel, P.C.; Mark R. DeLuca

(57) ABSTRACT

The invention relates to an environmentally friendly motor vehicle based on the use of energy-accumulating substances (EAS) and can be used not only in transportation engineering, but also in power engineering to produce electric power with the aid of thermal engines run on hydrogen that is produced from aluminum composites in reaction with water.
(Continued)

The object of the invention is to provide an environmentally friendly motor vehicle powered by hydrogen that is produced from EAS, comprising a closed water supply system to supply a reactor of a hydrogen generator with water obtained by condensing water vapors from exhaust gases, and quick change cartridges composed of a cylinder casing and a cover with hydrogen-generating elements in the form of plates of aluminum composites mounted inside the casing.

The object is attained in the following way. A motor vehicle comprising an internal combustion engine provided with a liquid cooling system with a primary radiator mounted in front of the engine, and a hydrogen generator accommodated in a trunk and operating on the reaction of aluminum composites with water, further comprises an exhaust gas cooling system to autonomously supply the generator with water by condensing water vapors in exhaust gases. The exhaust gas cooling system is connected to an exhaust manifold of the engine and consists of an expander, a condenser in the form of a gas/air heat exchanger and a storage tank for collecting water condensate and discharging uncondensed gases. The storage tank is connected by means of conduits to the hydrogen generator, wherein the supply of water to the latter and circulation of water in order to intensify the hydrogen release process are performed by a pump mounted inside the storage tank, and drainage of water from the generator into the storage tank is performed through a filter mounted in the generator housing.

7 Claims, 9 Drawing Sheets

(51) Int. Cl.
| | |
|---|---|
| *B01J 7/02* | (2006.01) |
| *B60K 15/00* | (2006.01) |
| *C01B 3/08* | (2006.01) |
| *F01N 3/04* | (2006.01) |
| *F01P 3/20* | (2006.01) |
| *F01P 3/22* | (2006.01) |
| *F02B 43/10* | (2006.01) |
| *F01N 5/02* | (2006.01) |
| *F01N 3/02* | (2006.01) |

(52) U.S. Cl.
CPC ............... *F01N 3/02* (2013.01); *F01N 3/046* (2013.01); *F01N 5/02* (2013.01); *F01P 3/20* (2013.01); *F01P 3/22* (2013.01); *F02B 43/10* (2013.01); *F01N 2240/02* (2013.01); *F01N 2240/22* (2013.01); *F01N 2260/024* (2013.01); *F01P 2060/10* (2013.01); *F02B 2043/106* (2013.01); *Y02E 60/36* (2013.01); *Y02T 10/121* (2013.01); *Y02T 10/16* (2013.01); *Y02T 10/20* (2013.01); *Y02T 10/32* (2013.01); *Y02T 90/42* (2013.01)

(58) Field of Classification Search
CPC ........ F02B 2043/106; B01J 7/02; C01B 3/08; B60K 15/00; Y02T 10/32; Y02T 90/42; Y02T 10/121
See application file for complete search history.

(56) References Cited

U.S. PATENT DOCUMENTS

| | | | |
|---|---|---|---|
| 8,336,508 B2 * | 12/2012 | Huttner | ............... F02B 43/10 |
| | | | 123/1 A |
| 8,424,496 B2 * | 4/2013 | Pursifull | ............... F02D 19/081 |
| | | | 123/1 A |
| 2002/0070127 A1 | 6/2002 | Song et al. | |
| 2004/0081615 A1 | 4/2004 | Brinkley | |
| 2004/0118111 A1 | 6/2004 | Covit | |
| 2007/0205111 A1 | 9/2007 | Bayliss | |
| 2008/0075987 A1 | 3/2008 | Kindler | |
| 2011/0138793 A1 | 6/2011 | Coletta | |

FOREIGN PATENT DOCUMENTS

| | | |
|---|---|---|
| JP | 2004115348 | 4/2004 |
| JP | 2010-073325 | 4/2010 |
| JP | 2010-121630 | 6/2010 |
| RU | 2407701 C2 | 12/2010 |
| RU | 2410325 C2 | 1/2011 |
| WO | 2009/129411 | 10/2009 |

OTHER PUBLICATIONS

Office Action for JP Patent Application No. 2016-529741 dated Dec. 5, 2017.
Notice of Allowance for JP Patent Application No. 2016-529741 dated May 8, 2018.

* cited by examiner

HYDROGEN MOTOR VEHICLE WITHOUT HYDROGEN ON BOARD

1. FIELD OF THE INVENTION

The invention relates to an environmentally friendly automobile based on the use of energy-accumulating substances (EAS) and can be used not only in transportation engineering, but also in power engineering to produce electric power with the aid of thermal engines driven by hydrogen that is produced from aluminum composites in reaction with water.

2. BACKGROUND ART

The best known example of a hydrogen-powered motor vehicle is a motor vehicle comprising a gas generator to produce hydrogen using EASs that release hydrogen in chemical reaction with water [1]. FIG. 1 shows a motor vehicle 1 comprising a hydrogen generator 3 mounted in the boot to supply a reciprocating engine 2 with hydrogen. FIG. 2 shows structural features of the hydrogen generator 3. The hydrogen generator is a batch-operated reactor. The reactor has a cylindrical housing with welded bottom plates. The upper bottom plate comprises four connections: for fill EAS, supplying water, discharging hydrogen and mounting thermocouples. The lower bottom plate comprises one connection for discharging reaction products. A branched system of liquid supply channels is provided to distribute liquid in a powder layer; the system comprises a vertical channel of 8 mm in diameter, having three connections of 6 mm in diameter that are disposed in three sites along the height of the vertical channel and have cylindrical nozzles at the ends, 9 pieces of 5 mm diameter in each.

The disadvantage of this generator design is the combination of the EAS capacity with the reaction zone, where the entire mass of EAS participates in chemical reaction, creating thereby a high excessive pressure, which leads to increased weight of the reactor due to increased wall thickness. It should also be noted that to obtain a required flow rate of hydrogen to power the internal combustion engine two reactors 3 are accommodated in the boot 3, which require constant replenishment with water.

To control the supply of hydrogen to the engine, a hydrogen supply control system (HSCS) is provided, which is shown in FIG. 3. The HSCS comprises a solenoid valve control distributor 1, an electric actuator 2, a solenoid valve 3, a supply manifold 4, conduits 5, a spacer 6, an intake manifold 7 and an engine 8. The HSCS operates as follows. Depending on the sequence of filling the cylinder of the engine 8, the solenoid valve control distributor 1 opens by an electric actuator 2 an appropriate solenoid valve 3, through which hydrogen is supplied from the supply manifold 4 through conduits 5 to the intake manifold 7 through the spacer 6.

The disadvantage of this device is that it is incapable of maintaining the required air-fuel mixture when the engine operation changes depending on the mode of travel of the car.

3. SUMMARY OF THE INVENTION

Hydrogen is the most environmentally friendly fuel. As can be seen from the equation of chemical reaction $2H_2+O_2=2H_2O$ the product of burning hydrogen is water. This aspect makes hydrogen the most attractive fuel for automobiles of all existing fuels on the planet.

Thus, burning 1 kg of $H_2$ releases 9 kg of water vapors. Conventional structures of automobiles that use EAS suggest the presence of water storage on board the automobile, which significantly increases its weight. For example, to produce hydrogen from aluminum the use can be made of the property of aluminum to react with non-concentrated acids:

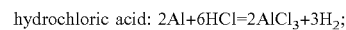
hydrochloric acid: $2Al+6HCl=2AlCl_3+3H_2$;

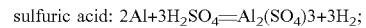
sulfuric acid: $2Al+3H_2SO_4=Al_2(SO_4)_3+3H_2$;

or with alkalis: $2Al+2NaOH+2H_2O=2NaAlO_2+3H_2$, and under certain conditions with water:

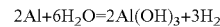
$2Al+6H_2O=2Al(OH)_3+3H_2$

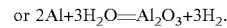
or $2Al+3H_2O=Al_2O_3+3H_2$.

As known, molar mass of aluminum is M=27 g/mol, which is equal to 0.027 kg/mol.

Molar mass of hydrogen, which consists of two atoms, is 2 g/mol, which is equal to 0.002 kg/mol, and molar mass of water is 18 g/mol. It follows that in all these reactions three molecules of hydrogen are obtained from two molecules of aluminum. Hence, 0.006 kg hydrogen is obtained in the reaction of each 0.054 kg of aluminum with 0.054 kg of water. In the second reaction of aluminum with water, 0.054 kg of water also participates to produce $Al_2O_3$. In the first reaction, the amount of water will be twice the amount to obtain $2Al(OH)_3$. With simple calculations we see that in chemical reactions involving 1 kg of aluminum and at least 1 kg of water, 0.111 kg of hydrogen is produced, the volume of which under normal conditions will be 1.24 cubic meters. Now calculate the energy value of the hydrogen produced. The heat of combustion of hydrogen is 120 MJ/kg. For the obtained amount of hydrogen the amount of energy produced when burned will be 13.32 MJ, which being converted into more apparent units is the energy of 3.7 kWh. If the energy value of gasoline is 46 MJ/kg on average, 0.296 kg of gasoline will be needed to replace the energy of hydrogen produced from 1 kg of aluminum.

Therefore, 9 kg of aluminum and at least 9 kg of water are required to obtain 1 kg of $H_2$ equivalent of 2.67 kg of gasoline, i.e. combustion of hydrogen in the engine forms the same amount of water (water vapors) as for its production.

The object of present invention is to provide an environmentally friendly motor vehicle powered by hydrogen produced from EAS, which comprises a closed water supply system to supply the reactor of a hydrogen generator with water obtained by condensing water vapors from exhaust gases, and quick change cartridges comprising a cylindrical casing and a cover, with hydrogen-generating elements in the form of plates of aluminum composites accommodated in the casing.

The object is attained as follows.

A motor vehicle comprising an internal combustion engine provided with a liquid cooling system with a primary radiator mounted in front of the engine, and a hydrogen generator accommodated in a boot and operating on the basis of the interaction between aluminum composites and water, further comprises an exhaust gas cooling system to autonomously supply the hydrogen generator with water by condensing water vapors in exhaust gases. The exhaust gas cooling system is connected to an exhaust manifold of the engine and consists of an expander, a condenser in the form of a gas/air heat exchanger and a storage tank for collecting water condensate and discharging uncondensed gases. The storage tank is connected by means of conduits to the hydrogen generator, wherein the supply of water to the latter and circulation of water in order to intensify the hydrogen release process are performed by a pump mounted inside the storage tank, and drainage of water from the generator into the storage tank is performed through a filter mounted in the housing of the generator.

The hydrogen generator is composed of individual reactors which are mounted in a staggered manner in receptacles on the upper surface of the housing of the generator, provided inside the housing in the form of cylinders with a smooth internal surface and external fins forming a cooling jacket between them connected to an additional liquid cooling system comprising a secondary radiator and an autonomous pump, wherein the secondary radiator is mounted in front of the primary radiator of engine cooling system.

The individual reactors of the hydrogen generator are made in the form of quick change cartridges consisting of a cylindrical casing and a cover, with hydrogen-generating elements mounted inside the casing and made in the form of plates of aluminum composites, wherein the upper part of the casing has water supply holes under the cover, and the lower part of the casing comprises a mesh filter for collecting reaction products for subsequent processing thereof, and water drainage holes, and the cover per se comprises hydrogen extraction holes, which are connected through conduits to a hydrogen supply manifold to supply hydrogen to the engine.

The engine comprises an automatic engine control system that includes a water supply control unit, a hydrogen flow sensor, a hydrogen receiver and a hydrogen supply control unit. Control of supplying a required amount of hydrogen for engine operation depending on the mode of travel of the motor vehicle is carried out by automatic control of valves of the water supply control unit. Water is supplied to the cartridges by staged and metered supply by the pump from the storage tank with adjustment of the flow rate responsive to feedback from the hydrogen flow sensor connected to the manifold of the hydrogen generator and the control unit of hydrogen supply into the engine, connected to the hydrogen flow sensor through the hydrogen receiver used to level pulsations in the hydrogen supply.

4. BRIEF DESCRIPTION OF DRAWINGS

FIG. 1 shows a structural diagram of a hydrogen motor vehicle selected as the most relevant prior art, a motor vehicle 1 comprising a hydrogen generator 3 mounted in the boot to supply hydrogen to a reciprocating internal combustion engine 2.

FIG. 2 is a sectional view of a hydrogen generator, which is a batch-operated reactor.

FIG. 3 shows a control system for supplying hydrogen to the engine, which comprises a solenoid valve control distributor 1, an electric actuator 2, a solenoid valve 3, a supply manifold 4, conduits 5, a spacer 6, an intake manifold 7 and an engine 8.

FIG. 4 shows a structural diagram of a hydrogen motor vehicle without hydrogen on board, which comprises a reciprocating engine 1, a primary radiator 3 of an engine liquid cooling system, an automatic engine control system 4, a water supply control unit 5, a storage tank 8, a secondary radiator 2 of the liquid cooling system of the hydrogen generator 6, a water supply pump 7 and an exhaust gas cooling system 9 connected to an exhaust manifold 10.

FIG. 5 shows a functional diagram of a motor vehicle provided with a hydrogen generator according to the invention, which comprises a secondary radiator 1 mounted in front of a primary radiator of the motor vehicle and intended for cooling the hydrogen generator, a reciprocating internal combustion engine 2, an exhaust manifold 3, an expander 4 for condensing water vapors of exhaust gases, a hydrogen supply control unit for controlling supply of hydrogen to injectors of the intake system, a hydrogen receiver 6 intended to reduce pulsations in hydrogen supply, a hydrogen flow sensor 7, a vapor condenser 8 for condensing water vapors of exhaust gases, a water storage tank 9, a pump 10 for circulating liquid coolant of the hydrogen generator, a hydrogen generator 11, quick-change cartridges 12 with plates based on aluminum composites, a water supply pump 13, a water supply control unit 14, a filter of a closed water circulation system 15, an engine control system 16 with hydrogen flow feedback at output of the generator, a hydrogen manifold 17 for collecting hydrogen from the cartridges and a circulating water manifold 18 for collecting water circulating through the cartridges.

FIG. 6 shows a dependence of volume of released hydrogen on time at T=25° C. Curve 1 shows the dependence of volume of released hydrogen at NaOH concentration of 3.0 g/mole. Curve 2 shows the dependence of volume of released hydrogen at NaOH concentration of 0.9 g/mol.

5. DESCRIPTION OF EMBODIMENT OF THE INVENTION

Figure 1:
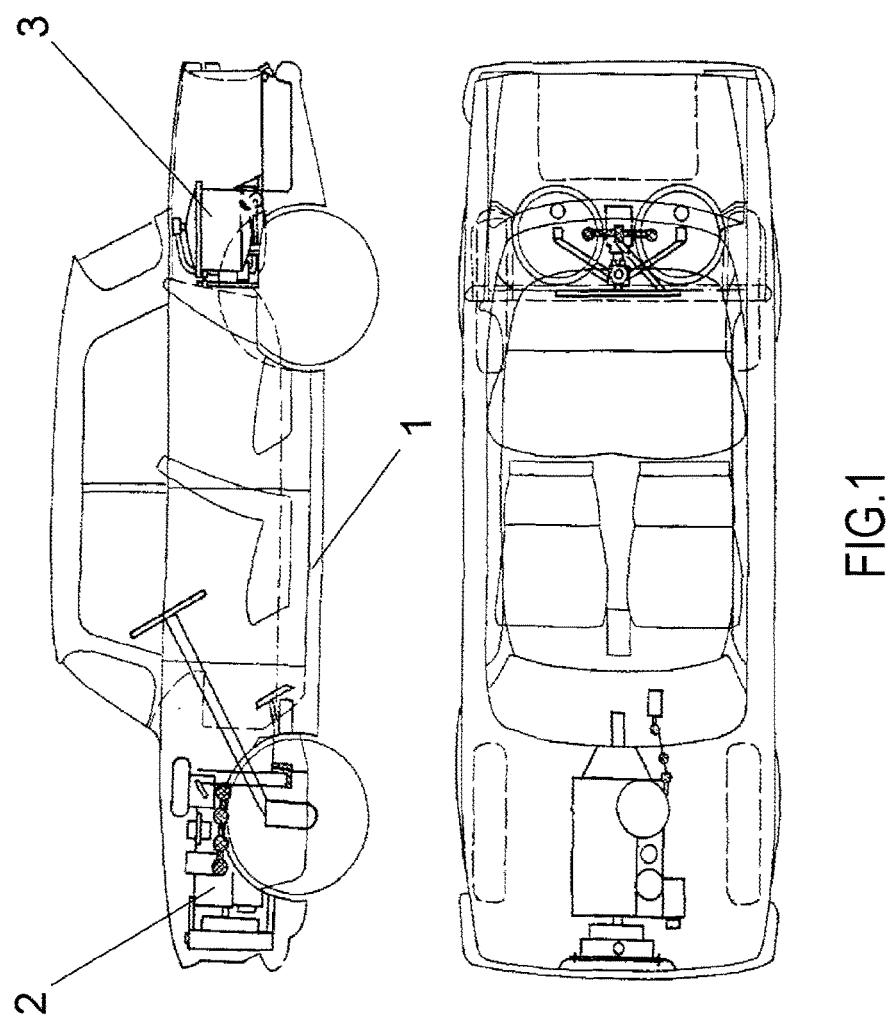
Figure 2:
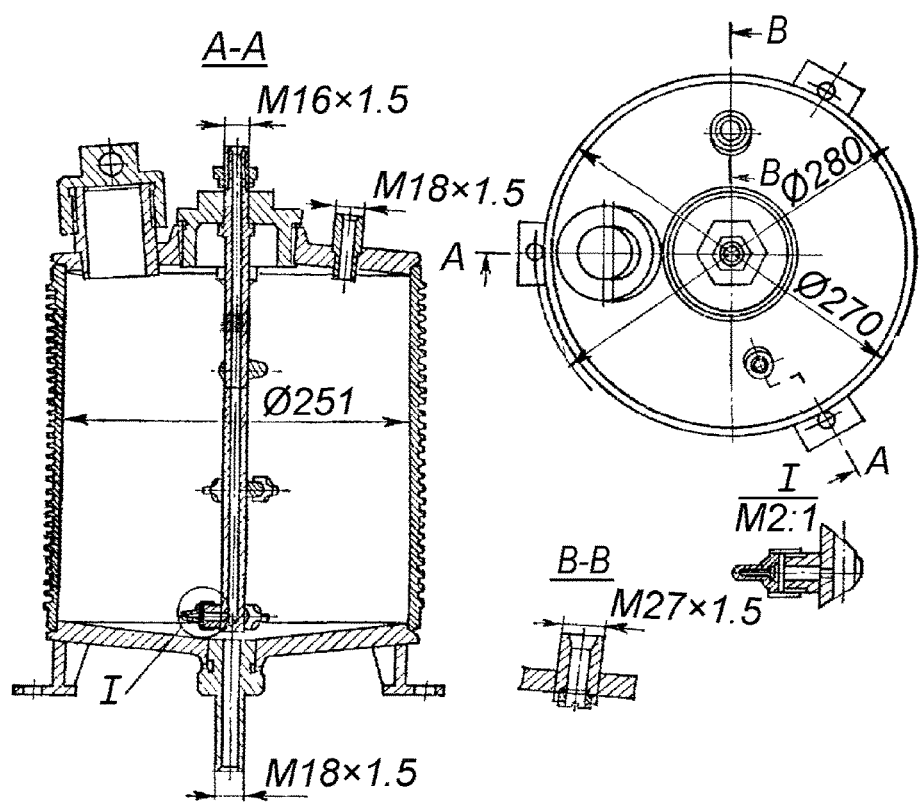
Figure 3:
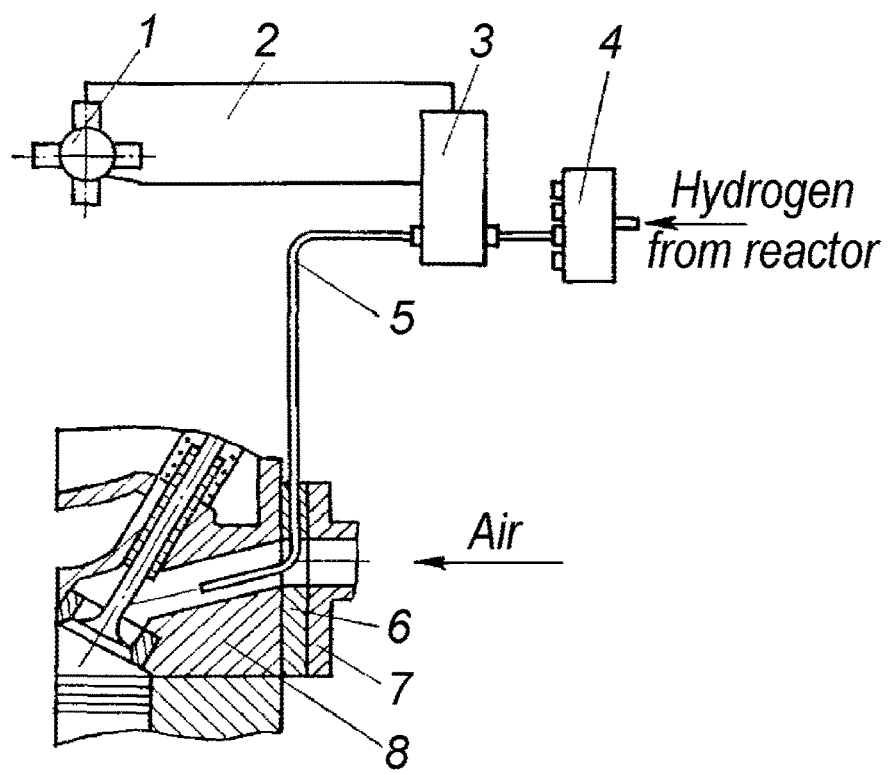
Figure 4:
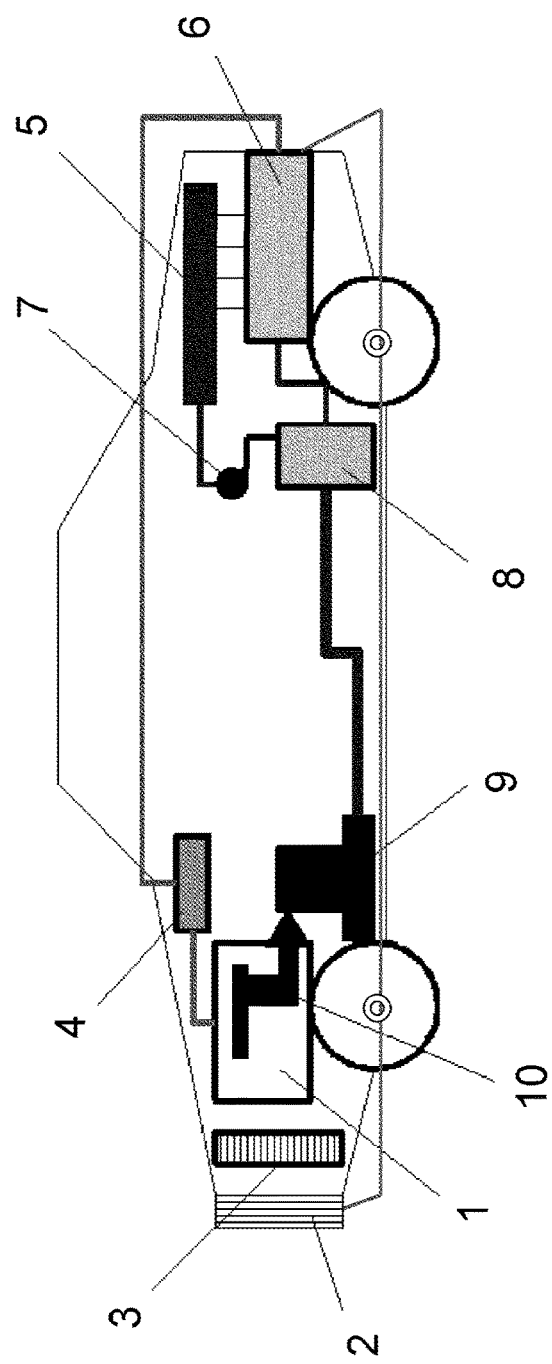

FIG. 4 illustrates how a hydrogen motor vehicle according to the invention can be implemented. A motor vehicle comprises a reciprocating engine 1 provided with an engine cooling system radiator 3, an automatic engine control system 4 for supplying hydrogen into the engine 1, which controls a water supply control unit 5 for producing hydrogen in a generator 6 depending on the motion cycle of the car. The motor vehicle comprises an exhaust gas cooling system 9, which is connected to an exhaust manifold 10 of the engine 1. As a result of condensation of water vapors the condensate enters a storage tank 8, where a water supply pump 7 delivers the condensate through a water supply control 5 to the hydrogen generator 6.

Figure 5:
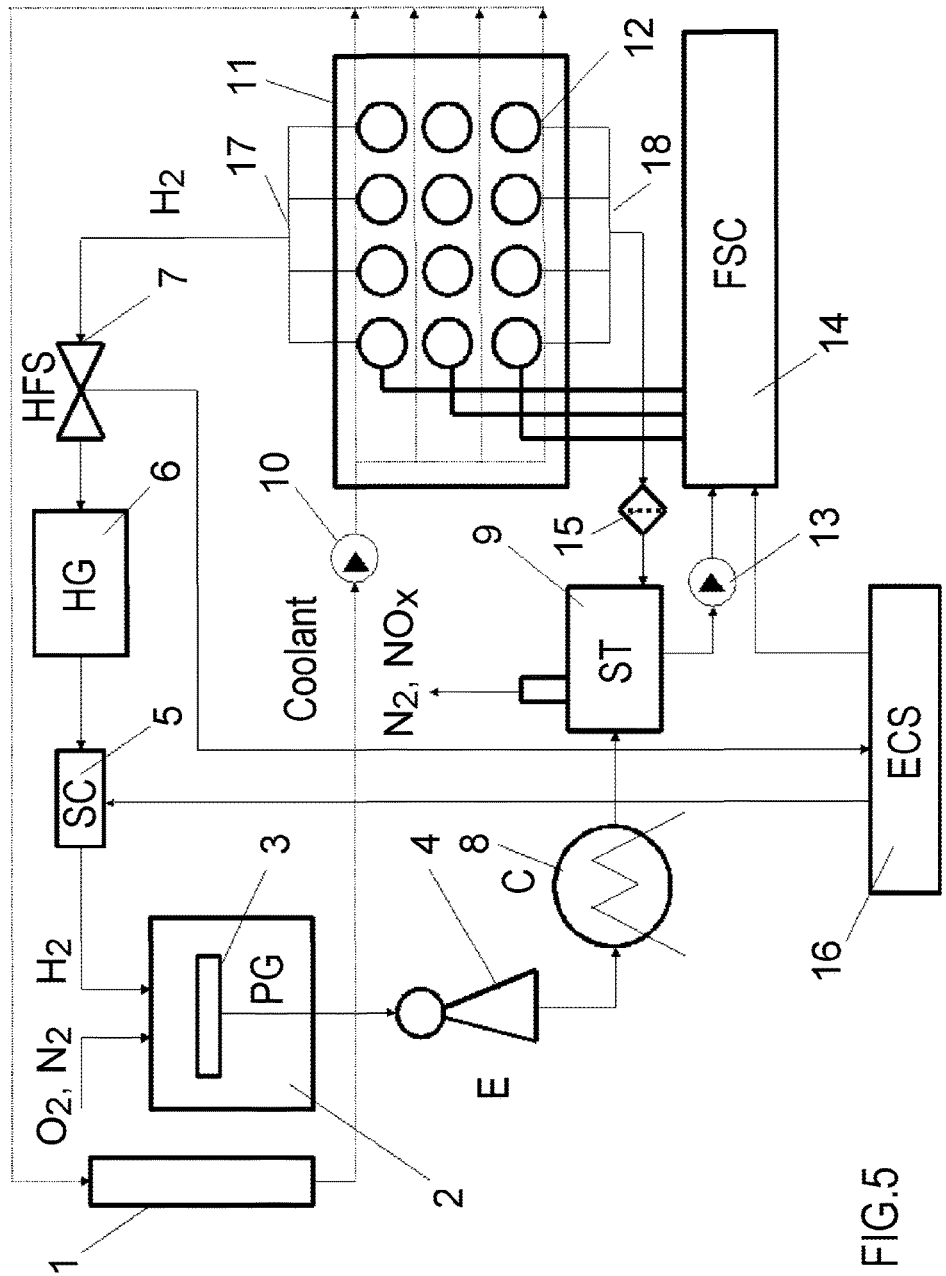

FIG. 5 shows a functional diagram explaining the principle of operation of the car. The hydrogen motor vehicle operates as follows.

Prior to starting operation of the motor vehicle quick change cartridges 12 are mounted in the hydrogen generator 11. A cartridge 12 is formed in a cylindrical casing which accommodates hydrogen-generating elements in the form of plates of aluminum composites. The lower part of the cartridge casing comprises a mesh filter for collecting and subsequent processing of reaction products and drainage holes for draining water, which is supplied, through a manifold 18 and a filter of a closed water circulation system 15, to a storage tank 9. The upper part of the casing has, under a cover, holes through which water is supplied by a water supply control 14 into cartridges in distributed and metered manner. Upon water entering the cartridges the production of hydrogen starts, and the latter flows through special holes in the cover into a manifold 17, and through the hydrogen flow sensor 7 to the hydrogen receiver 6. The hydrogen receiver 6 smoothes pulsations of staged supply of hydrogen. The hydrogen flow sensor 7 provides water supply feedback to the generator 11 through the engine control system 16 and the water supply control 14 by the pump 13.

Temperature in the reaction zone of the generator 11 is controlled by circulating cooling water by the pump 10 through the liquid radiator 1 mounted in front of the primary radiator of the car. The hydrogen supply control unit 5 provides distributed supply of hydrogen to injectors of the engine intake system 2.

Instead of a regular exhaust system, an exhaust gas cooling system is connected to the exhaust manifold 3 and comprises an expander 4 and a condenser 8, where water vapors from exhaust gases are condensed; the resulting condensate flows into a water storage tank 9, which discharges non-condensable gases as well.

For this purpose, an alloy of aluminum and sodium hydroxide has been designed, which dissolves oxide film on the aluminum surface and opens the latter to water [2]. The solvent in this alloy is alkali, specifically sodium hydroxide (NaOH):

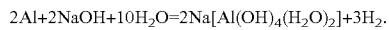

$$2Al+2NaOH+10H_2O=2Na[Al(OH)_4(H_2O)_2]+3H_2.$$

Figure 6:
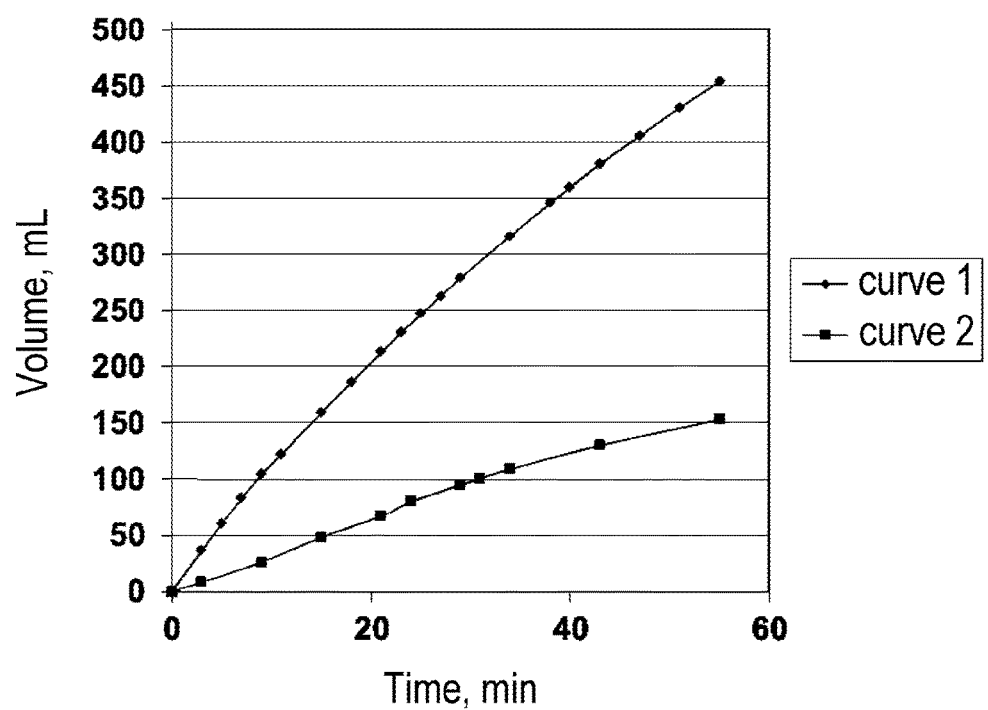

Dependence of the hydrogen release rate on the NaOH concentration in the solution was studied on samples of the aluminum alloy with the following composition: Al 97.96%; C 1.49%; Mn 0.53%. FIG. 6 shows an exempary dependence of the released hydrogen volume on time. This dependence was studied on two concentrations of NaOH. Two solutions were prepared with NaOH concentrations of 0.9 mol/L (molar ratio Al:NaOH=6:1) and 3 mol/L (molar ratio Al:NaOH=1:1). Temperature in the reactor was maintained constant at 25° C.

Figure 7:
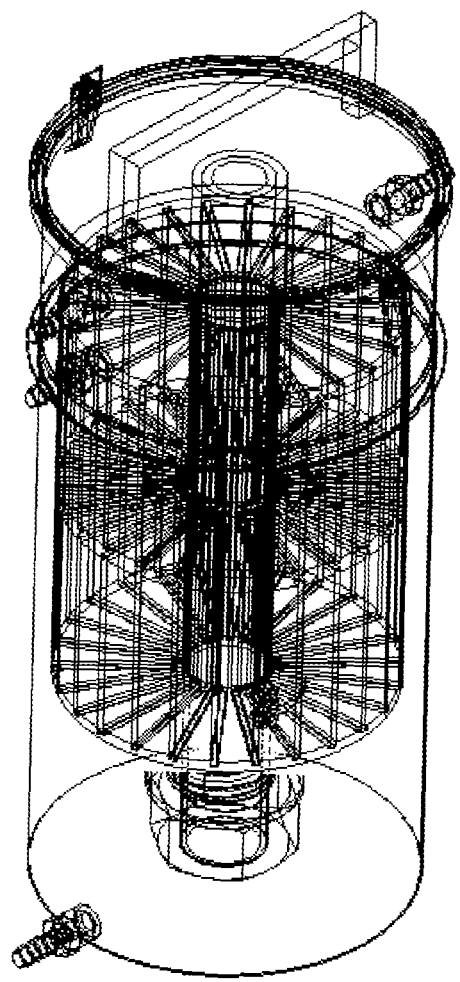
FIG. 7 is a perspective view of a hydrogen generator according to Patent RU 2407701.

For the above alloy a pilot gas generator was designed capable of producing up to 700 liters of hydrogen per hour for hours [3]. The hydrogen generator shown in FIG. 7 is a cylindrical reservoir with the following dimensions: height 357 mm, diameter 180 mm, maximum width at the top 201 mm.

Figure 8:
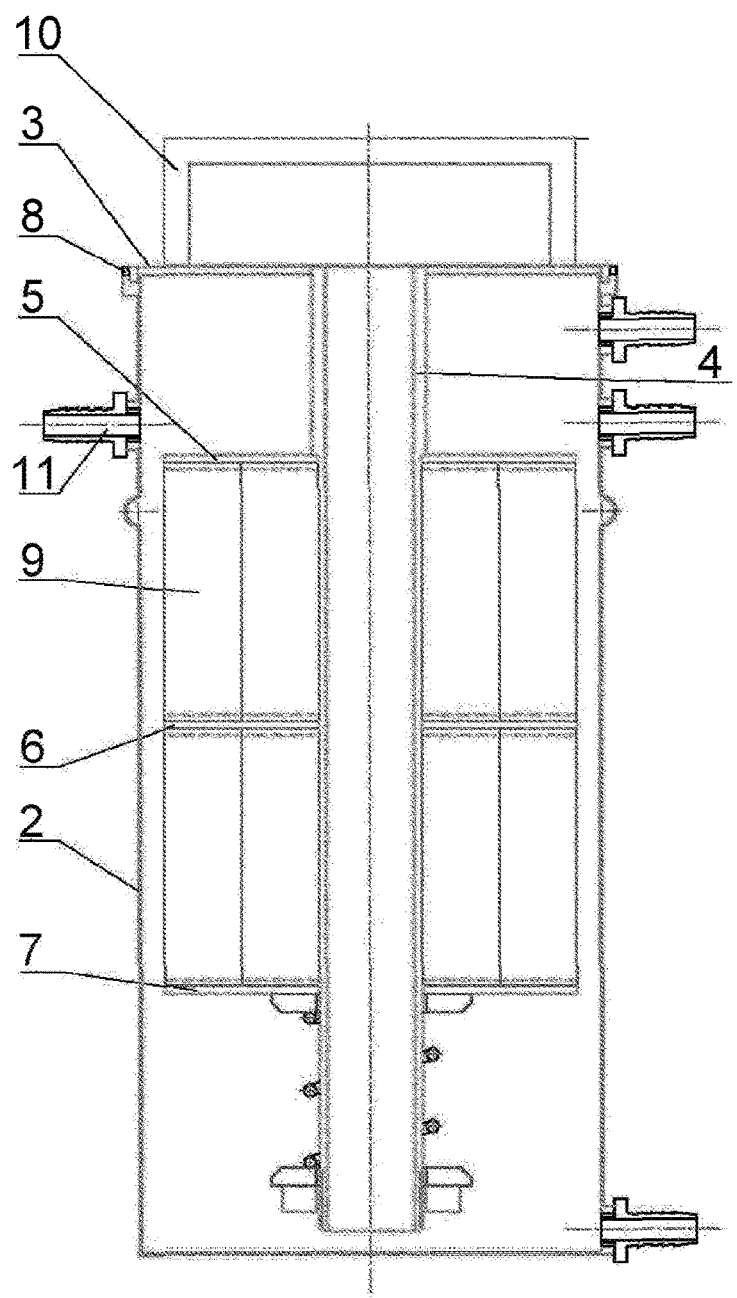
FIG. 8 is a structural diagram of a hydrogen generator according to Patent RU 2407701.

The housing (numeral 2) of the gas generator (FIG. 8) is made of stainless steel 300 mm in height and 180 mm in diameter. The wall thickness is 0.6 mm according to the technology. To strengthen the housing a convexity was used in the upper part of the housing (not shown in the drawing, because the safety margin is provided by thicker walls). The housing comprises 4 holes for future attachment of connections (numeral 11) with ½ inch working diameter. The main housing will be closed on top by an easily removable cover (numeral 3), to which a handle (numeral 10) for easy opening is welded on the upper side, and a fastening element (numerals 4, 5, 6 and 7) is welded in the center on the underside for plates of an aluminum alloy containing 10% sodium hydroxide (activated aluminum) (numeral 9).

A rubber gasket (numeral 8) is provided between the main housing of the tank and the cover to increase tightness of the gas generator. Fastening element for the plates is made of Teflon or Plexiglas. The fastening element has cutout grooves with depth of 2.5 mm and width of 3 mm, into which the activated aluminum plates are inserted. Basic requirements to the plate fastening element are ease of processing, low cost of production, ability to withstand temperatures over 100° C.

The plates of activated aluminum are made from aluminum chips, powder, sawings, etc. with the addition to this mass of sodium hydroxide 10% by weight of the total amount. The plates are made by stamping or pressing. The plates should have inside an aluminum frame of thin aluminum wire. Basic requirements are uniform distribution of sodium hydroxide throughout the volume of the plate, physical resistance of the plate against destruction under pressure and high temperature. Dimensions of the plates are 100 mm height, 30 mm width and 3 mm thickness.

Performance of the aluminum alloy is provided by the percentage of sodium hydroxide in aluminum (not less than 10%) and the total surface area of the aluminum composite, and the temperature of water supplied into the reactor. Studies have shown that the higher the water temperature, the faster the reaction proceeds, and the greater amount of hydrogen releases for a predetermined time.

Figure 9:
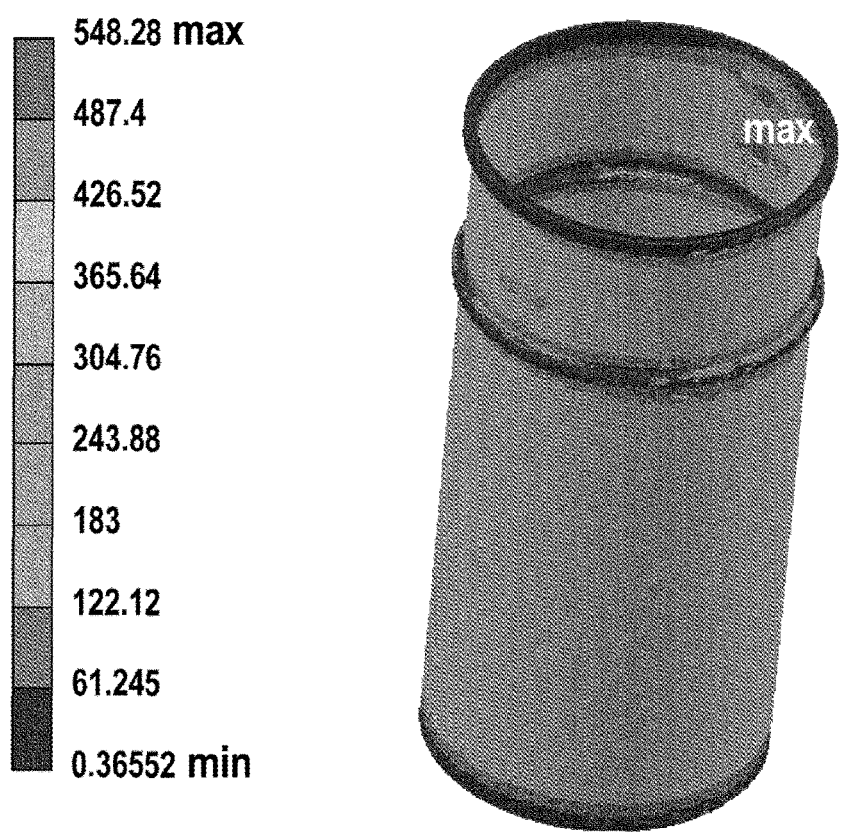
FIG. 9 shows analysis of equivalent stresses of the reactor housing at the hydrogen pressure of 1 MPa.

The hydrogen reactor operates under the pressure of 1.3 atmospheres (0.13 MPa). In the calculation of equivalent stresses the value of 1 MPa was specified, which is eight times higher than the working one. Calculations in FIG. 9 demonstrate that maximum stresses are at the holes for connections. Minimum stresses are at the bottom, on the top, and the protrusion.

The system generating hydrogen by chemical reaction between water and aluminum composite has several levels of protection against spontaneous combustion or explosion, and also from external factors. Even in the event of an accident of the car, and as a consequence of damage to the reactor there will be no explosion. Working pressure in the reactor is 1.3 atm. Due to immediate consumption the produced hydrogen does not accumulate and is immediately burned in the internal combustion engine or turbine. At depressurization of the reactor all water will bleed from it and production of hydrogen will stop.

This system can exist independently. It can be used both in automobiles and in other objects as a hydrogen production plant. To fill the motor vehicle, it is required only to replace the cartridge with aluminum composite and remove spent aluminum hydroxide.

Aluminum hydroxide is a valuable raw material and can be used for re-production of aluminum or for fabrication of high-strength metal ceramic products and parts. Recycling of aluminum hydroxide can be carried out using surplus power of hydro and nuclear power plants, which will make it even cheaper and more cost effective.

Principle of operation of a motor vehicle with a hydrogen plant is as follows: a cartridge with aluminum composite is loaded in the reactor. Upon starting the engine the water pump injects water into the reactor. This immediately starts the production of hydrogen which is used as fuel for the engine. After depletion of the aluminum composite the motor vehicle should be refilled. This procedure comprises removing the spent cartridge with aluminum composite from the reactor, retrieving aluminum hydroxide, and inserting a new cartridge with aluminum composite. When the hydrogen motor vehicle is being refilled, the engine should be stopped for safety reasons. When the engine is stopped, water automatically bleeds from the reactor and the chemical reaction stops.

The presented results are taken from the research work, which was performed as part of the Rosnauka Federal Program on State Contract No. 02.516.11.6116, "Research and Development of Hydrogen Production Technologies Based on Activated Aluminum Composites without Rare Earth Metals for Power Plants".

LIST OF REFERENCES

1. Varshaysky I. L. Energy Accumulating Substances and Their Use. Kiev: Naukova Dumka, 1980, pp. 79-105.

2. Aluminum-Based Composite Material for Producing Hydrogen and Preparation Method thereof. Patent RU 2410325, IPC C01B/08, Publ. 27 Jan. 2011, Bull. No. 3.

3. Gas Generator for Producing Hydrogen. Patent RU 2407701, IPC C01B/08, B01J/02, Publ. 27 Dec. 2010, Bull. No. 36.

The invention claimed is:

1. A motor vehicle comprising an internal combustion engine provided with a liquid cooling system with a primary radiator, and a hydrogen generator operating on the basis of interaction between aluminum composites and water, wherein the motor vehicle comprises a closed system for regenerating water vapors in exhaust gases to autonomously supply the hydrogen generator with water by cooling the water vapors, by an adiabatic expansion process, to a temperature corresponding to the partial pressure of water vapor saturation, and then condensing the water vapors in exhaust gases as a result of heat removal, said system being connected to an exhaust manifold of the engine and comprising an expander, a condenser in the form of a gas/air heat exchanger and a storage tank for collecting water condensate and discharging uncondensed gases; the storage tank being connected by means of conduits to the hydrogen generator; wherein the supply of water to the hydrogen generator and circulation of water in order to intensify the hydrogen release process is performed by a pump mounted inside the storage tank, and drainage of water from the hydrogen generator into the storage tank is performed though a filter mounted in a housing of the hydrogen generator, wherein the hydrogen generator is composed of individual reactors which are mounted in a staggered manner in receptacles on the upper surface of the housing of the hydrogen generator, wherein the receptacles are provided inside the housing in the form of cylinders with a smooth internal surface and external fins forming a cooling jacket between them, wherein the cooling jacket is coupled to an additional liquid cooling system comprising a secondary radiator and an autonomous pump, wherein the secondary radiator is mounted in front of the primary radiator of engine cooling system.

2. The motor vehicle according to claim 1, wherein the hydrogen generator comprises individual quick change reactors made in the form of replaceable cartridges comprising a cylindrical housing and a cover, with hydrogen-generating elements mounted inside the cylindrical housing and made in the form of plates of aluminum composites, wherein the upper part of the cylindrical housing has water supply holes under the cover, and the lower part of the cylindrical housing comprises a mesh filter to collect reaction products for subsequent processing thereof, and has holes for draining water from the reactor, and the cover comprises hydrogen extraction holes, which are connected through conduits to a hydrogen supply manifold to supply hydrogen to the engine.

3. The motor vehicle according to claim 1, wherein the engine comprises a system of automatic control of hydrogen production by individual reactors to control output of the reactors and further supply of hydrogen to the engine; the system comprising a water supply control unit, a hydrogen flow sensor, a hydrogen receiver and a hydrogen supply control unit, wherein control of supplying a required amount of hydrogen for engine operation depending on the mode of travel of the motor vehicle is carried out by automatic control of valves of the water supply control unit by staged and metered supply of water to the cartridges by the pump from the storage tank with adjustment of the water flow rate responsive to feedback from the hydrogen flow sensor coupled to the manifold of the hydrogen generator and a control unit for hydrogen supply into the engine, said control unit being coupled to the hydrogen flow sensor through the hydrogen receiver used to smooth pulsations upon supply of hydrogen into the engine.

4. A motor vehicle comprising an internal combustion engine operated only with hydrogen and outboard air, or a hydrogen fuel cell engine operated only with hydrogen and outboard air, and a hydrogen generator generating said hydrogen for the internal combustion engine or the hydrogen fuel cell engine on the basis of a reaction between aluminum composites and water, wherein the motor vehicle comprises a completely closed system for regenerating water vapors in exhaust gases to autonomously supply the hydrogen generator with water that produces hydrogen upon reaction with the aluminum composites, said system being coupled through a connecting pipe to an exhaust manifold of the engine and comprising an expander configured to cool the water vapors by an adiabatic expansion process to a temperature corresponding to the partial pressure of water vapor saturation, a condenser following the expander and provided in the form of a gas/air heat exchanger configured for subsequent condensing of the water vapors in the exhaust gases by removal of heat from the gases and a storage tank configured to collect water condensate and discharge uncondensed gases; the storage tank being coupled by means of conduits to the hydrogen generator; wherein the supply of water to the hydrogen generator and circulation of water in order to intensify the hydrogen release process is performed by a pump mounted inside the storage tank, and drainage of water from the hydrogen generator into the storage tank is performed though a filter mounted in a housing of the hydrogen generator.

5. The motor vehicle according to claim 4, wherein the hydrogen generator is composed of individual hydrogen reactors which are mounted in a staggered manner in receptacles on the upper surface of the housing of the hydrogen generator, wherein the receptacles are provided inside the housing in the form of cylinders with a smooth internal surface and external fins forming a cooling jacket, wherein the cooling jacket is coupled to an additional liquid cooling system comprising a secondary radiator and an autonomous pump, wherein the motor vehicle further comprises a liquid cooling system with a primary radiator mounted in front of the engine, and wherein the secondary radiator is mounted in front of the primary radiator of engine cooling system.

6. The motor vehicle according to claim 4, wherein the hydrogen generator comprises individual quick change reactors made in the form of replaceable cartridges comprising a cylindrical housing and a cover, with hydrogen-generating elements mounted inside the cylindrical housing and made in the form of plates of aluminum composites, wherein the upper part of the cylindrical housing has water supply holes under the cover, and the lower part of the cylindrical housing comprises a mesh filter to collect reaction products for subsequent processing thereof, and has holes for draining water from the reactor, and the cover comprises hydrogen extraction holes, which are connected through conduits to a hydrogen supply manifold to supply hydrogen to the engine.

7. The motor vehicle according to claim 4, wherein the engine comprises a system of automatic control of hydrogen production by individual reactors to control output of the reactors and further supply of hydrogen to the engine; the system comprising a water supply control unit, a hydrogen flow sensor, a hydrogen receiver and a hydrogen supply control unit, wherein control of supplying a required amount of hydrogen for engine operation depending on the mode of travel of the motor vehicle is carried out by automatic control of valves of the water supply control unit by staged and metered supply of water to the cartridges by the pump from the storage tank with adjustment of the water flow rate responsive to feedback from the hydrogen flow sensor coupled to the manifold of the hydrogen generator and a control unit for hydrogen supply into the engine, said control unit being coupled to the hydrogen flow sensor through the hydrogen receiver used to smooth pulsations upon supply of hydrogen into the engine.

* * * * *